US012663293B2

(12) United States Patent
Van Nieuwenhuyze

(10) Patent No.: US 12,663,293 B2
(45) Date of Patent: Jun. 23, 2026

(54) METHOD AND SYSTEM FOR CALIBRATION OF MEASUREMENT DEVICE FOR MAPPING UNDERGROUND PIPELINES

(71) Applicant: REDUCT NV, Schelle (BE)

(72) Inventor: Hans Van Nieuwenhuyze, Wilrijk (BE)

(73) Assignee: REDUCT NV, Schelle (BE)

( * ) Notice: Subject to any disclaimer, the term of this patent is extended or adjusted under 35 U.S.C. 154(b) by 351 days.

(21) Appl. No.: 18/421,156

(22) Filed: Jan. 24, 2024

(65) Prior Publication Data

US 2025/0237529 A1      Jul. 24, 2025

(51) Int. Cl.
  *G01C 25/00*      (2006.01)
  *F16L 101/30*      (2006.01)
  *G01C 21/16*      (2006.01)

(52) U.S. Cl.
  CPC ........ *G01C 25/005* (2013.01); *F16L 2101/30* (2013.01)

(58) Field of Classification Search
  CPC ... G01C 25/005; G01C 21/16; F16L 2101/30; F16L 55/48; F16L 55/26
  See application file for complete search history.

(56) References Cited

U.S. PATENT DOCUMENTS

| | | | |
|---|---|---|---|
| 4,454,756 A | 6/1984 | Sharp et al. | |
| 2022/0082198 A1* | 3/2022 | AlShammari | ........... F16L 55/48 |
| 2022/0136380 A1 | 5/2022 | Kuckes et al. | |

FOREIGN PATENT DOCUMENTS

| | | | |
|---|---|---|---|
| CN | 103308073 A | 9/2013 | |
| CN | 109269500 A | 1/2019 | |
| CN | 113465629 A | 10/2021 | |
| CN | 116698082 A  * | 9/2023 | ............. G01C 25/00 |
| WO | 2004/048892 A1 | 6/2004 | |

OTHER PUBLICATIONS

International Search Report issued in Belgian Patent Application No. BE 2023/5042, mailed Aug. 8, 2023.

* cited by examiner

*Primary Examiner* — Laura Martin
*Assistant Examiner* — Anthony W Megna Fuentes
(74) *Attorney, Agent, or Firm* — Troutman Pepper Locke LLP; Scott D. Wofsy

(57)      ABSTRACT

Method and system for calibration of a measurement device for mapping underground pipelines. The method comprises the steps of mounting the measurement device on a calibration device configured for performing a calibration program on the measurement device, and executing the calibration program by means of the calibration device. The system is configured for performing the calibration method.

20 Claims, 6 Drawing Sheets

3

6

3

6

4

4

METHOD AND SYSTEM FOR CALIBRATION OF MEASUREMENT DEVICE FOR MAPPING UNDERGROUND PIPELINES

CROSS-REFERENCE TO RELATED APPLICATIONS

This Application claims priority to Belgian Patent Application No. 2023/5042 filed on Jan. 24, 2023, the contents of which is incorporated herein by reference in its entirety.

TECHNICAL FIELD

The present invention relates to a method and a system for calibration of a measurement device for mapping underground pipelines.

BACKGROUND ART

From WO 2004/048892 A1 and WO 2004/048893 A1 methods and measurement devices for mapping underground pipelines are known. Such a measurement device includes a number of sensors for the collection of various physical measurement values during movement by means of samples, such as a heading, roll, acceleration, speed, temperature, gravity or others, so that data on the trajectory of the pipeline as well as data on the measurement conditions can be obtained. Examples of sensors that may be included in the measurement device are gyroscopes, accelerometers, magnetometers and a thermometer. During the movement of the device through the pipeline, the measured values from the various sensors are stored in a memory of the measurement device for later evaluation using a specific pipeline mapping software.

From WO 2004/048892 A1 and WO 2004/048893 A1 also methods are known for calibrating such a measurement device. The well-known calibration includes, for example, moving the measurement device along a known trajectory.

The well-known calibration method still requires a lot of manual operations and can therefore sometimes result in inaccuracies.

DISCLOSURE OF THE INVENTION

It is an aim of the invention to provide an improved method and system for calibration of such a measurement device, which may increase the accuracy of measurements carried out with the measurement device and/or is less labor-intensive.

This aim is achieved by means of the method according to the first independent claim, and a system for the application of this method. Preferred embodiments of the method are indicated in the dependent claims.

The methods and systems as disclosed herein are for calibration of measurement devices for mapping underground pipes, wherein the measurement device is provided for being moved through the underground pipeline and comprises at least a set of gyroscopes and accelerometers for sensing a trajectory of the underground pipeline as it is being moved through the pipeline.

The invention includes, in a first aspect, a method for calibration of a measurement device for the mapping of underground pipes, including the steps of setting up the measurement device on a calibration device intended to perform a calibration program on the measurement device, and performing the calibration program by means of the calibration device.

The calibration device preferably comprises the following components: a table on which the measurement device is mountable, wherein the table is rotatable around a vertical axis and tiltable around a horizontal transverse axis; at least one holder provided on the table and configured for holding the measurement device on the table, each holder being equipped with roller elements for rolling the measurement device around a longitudinal axis in relation to the table; actuators for driving rotational and tilting movements of the table and rolling movements of the roller elements; and a control unit for executing the calibration program by controlling the actuators.

The calibration program preferably includes the following routines: a first routine comprising a rotation of the table around the vertical axis over several revolutions while the table is preferably in a tilted position, and a plurality of second routines which each comprise tilting the table, bringing the table into two 1800 separated positions and rolling the measurement device at least once, as further described below.

The first routine involves a rotation of the table around the vertical axis over a number of revolutions, e.g. 2 to 100 revolutions. The number of revolutions is preferably at least 3, preferably at least 5, with more preference at least 10. The number of revolutions of the first routine is preferably no more than 50, preferably no more than 40, more preferably no more than 30. The number of revolutions may also be any other number. The purpose of this first routine is to synchronize an internal clock of the measurement device with the calibration device, by accurately measuring the rotation speed of the table. This makes it possible to accurately determine how many clock pulses correspond on average to a complete revolution of the table.

The second routines include each time the following steps.

A first step (a) is to tilt the table to a predetermined angle (relative to the horizontal position). For example, this predetermined angle may be chosen from the group containing $-60°, -45°, -30°, -15°, 0°, 15°, 30°, 45°, 60°$. However, the predetermined angle may also be any other angle.

A second step (b) involves positioning the table in two still positions, rotated 180° relative to each other, preferably by rotation around the vertical axis over two times 180° with a predetermined rest period in between. For example, this rest period may be at least 1 s, preferably at least 2 s, with more preference at least 3 s, and/or at most 10 s, preferably at most 8 s, more preferably at most 5 s. The purpose of this step is to collect measurement data that are 180° separated from each other and to thereby determine measurement errors that cancel each other out as a result of an opposite sign.

A third step (c) involves rolling the measurement device over a predetermined number of degrees, e.g. at least 5°, preferably at least 10° and/or at most 90°, preferably at most 60°, more preferably at most 30°. This results in a different (roll) position of the measurement device for a subsequent measurement according to step (b).

Steps (b) and (c) are preferably repeated at least once. Preferably, the steps are repeated a sufficient number of times so that the measurement device is rolled 360° in every second routine and thus returned to its original (roll) position.

Due to the plurality of second routines, a large number of redundant measurement data and/or measurement data that cancel each other out may be obtained, i.e. measurement data in overlapping and/or 180° separated positions. The measurement data may subsequently be analyzed by means of computer implemented steps. The analysis may include one or more of the following comparison steps:

comparing an internal clock of the measurement device with the duration of the number of revolutions of the first routine;

comparing the measurement data collected during each complementary pair of the second routines in which the table is respectively tilted to the opposite angle in step (a);

comparing the measurement data collected during each step (b) of each second routine, preferably during the two still positions and/or during the rotation around the vertical axis over two times 180°.

By means of these computer implemented steps for analyzing the measurement data, measurement errors can be determined, which may then be taken into account during the measurement of an underground pipeline using the calibrated measurement device and/or when processing measurement data collected by means of the calibrated measurement device.

The invention includes, in a second aspect, a method for mapping an underground pipeline, including the steps of calibrating a measurement device by means of calibration method as described herein, moving the measurement device through the underground pipeline at least once and determining a trajectory of the underground pipeline on the basis of measurement data collected during the movement of the measurement device at least once through the underground pipeline, wherein measurement errors determined by means of the calibration method are taken into account upon determining the trajectory.

The invention includes, in a third aspect, a system for calibration of a measurement device for the mapping of underground pipelines, comprising a calibration device as described elsewhere herein, on which the measurement device is mountable and which is provided for the execution of a calibration program on the measurement device, and a control unit provided for controlling and executing the calibration program as described elsewhere herein, by means of the calibration device.

BRIEF DESCRIPTION OF THE DRAWINGS

The invention will be further elucidated by means of the following description and the appended figures.

MODES FOR CARRYING OUT THE INVENTION

Figure 1:
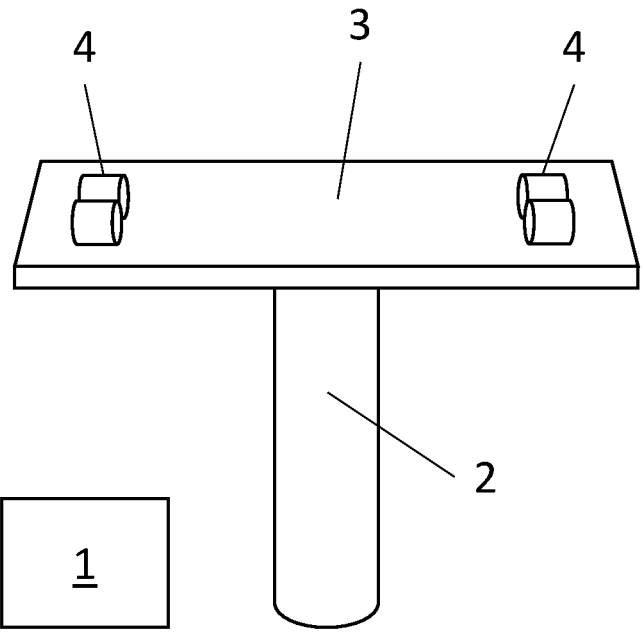
FIGS. 1 to 3 show schematic views of an embodiment of a calibration device according to the invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

Furthermore, the various embodiments, although referred to as "preferred" are to be construed as exemplary manners in which the invention may be implemented rather than as limiting the scope of the invention.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present invention, the only enumerated components of the device are A and B, and further the claim should be interpreted as including equivalents of those components.

The calibration device and the calibration method shown in the figures are embodiments according to the invention, e.g. suitable for calibration of measurement devices known from the following patent publications of the same applicant and incorporated herein by reference: WO 2004/048892 A1, WO 2004/048893 A1 and WO 2022/122424 A1. However, the embodiments of the calibration device and the calibration method according to the invention may also be used for calibration of other measurement devices for the mapping of underground pipelines.

Figure 2:
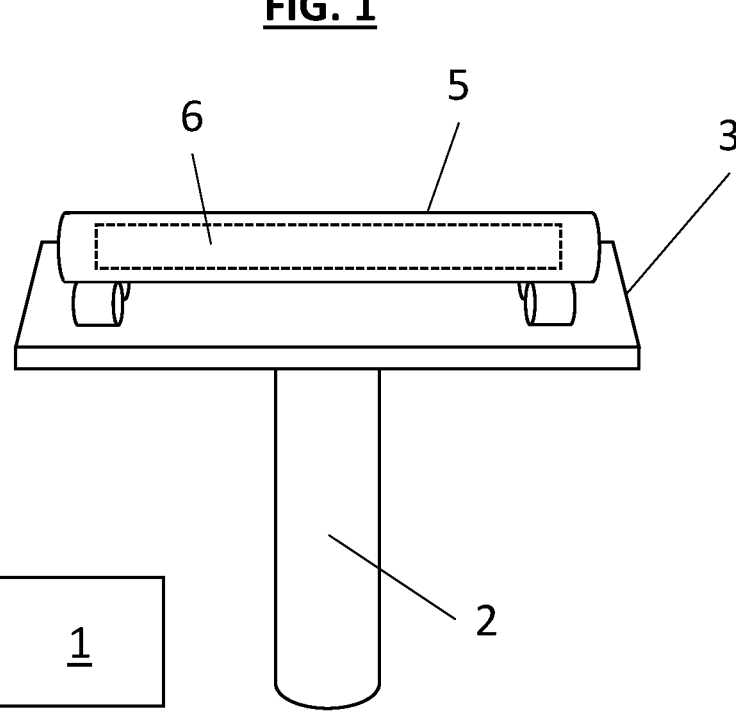
Figure 3:
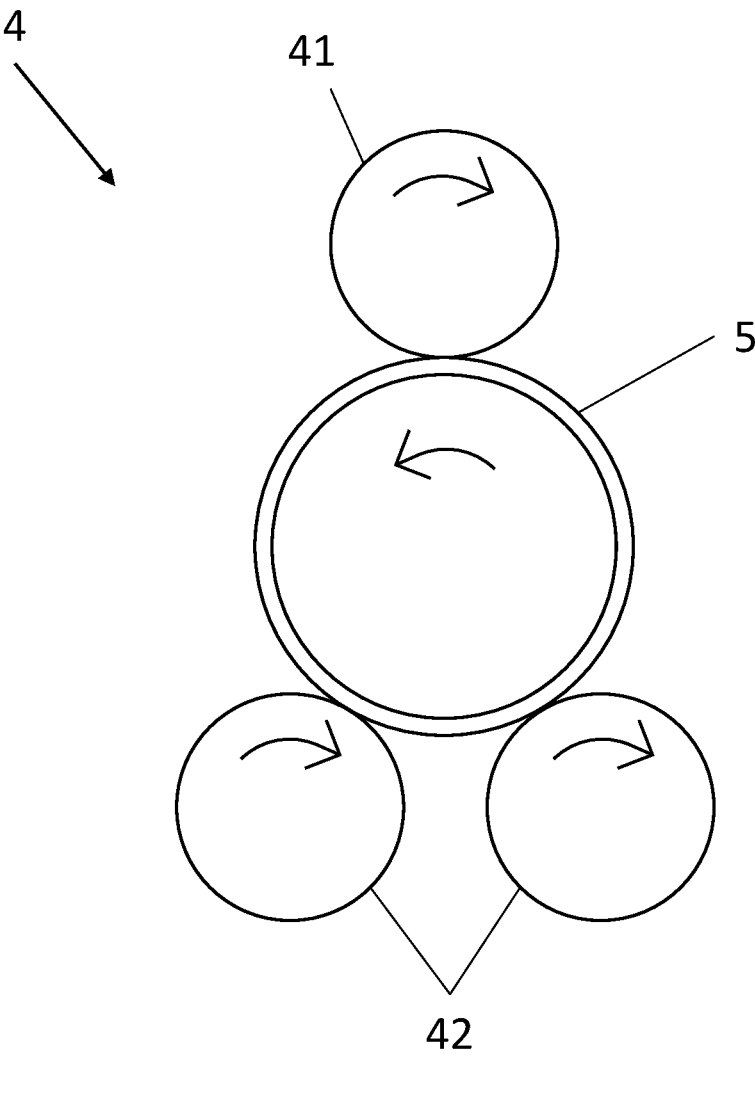

FIGS. 1 to 3 show schematic views of an embodiment of a calibration device 2 according to the invention. FIG. 1 shows the calibration device on its own. FIG. 2 shows the calibration device with a measurement device mounted thereon for calibration. The calibration device 2 includes a table 3 on which the measurement device is mounted. The table is mounted on top of a support, in such a way that the table 3 is rotatable around a vertical axis and tiltable around a horizontal transverse axis. On both sides of the table 3, a holder 4 is provided for holding the measurement device on the table, each holder being equipped with roller elements 41, 42 (see FIG. 3) for rolling the measurement device around a longitudinal axis in relation to the table. If the measurement device has a cylindrical housing, the measurement device may be placed directly on the roller elements. In the embodiment shown in the drawings, the measurement device 6 is fixed inside a cylindrical tube 5, which is in turn mounted on the roller elements 41, 42. The calibration device 2 further comprises actuators (not shown) for driving rotational and tilting movements of the table and rolling movements of the roller elements and a control unit 1 provided for the execution of the calibration program by controlling the actuators. For example, the actuators may be electric stepper motors, in such a way that the rotational, tilting and rolling movements over the desired number of degrees can be carried out accurately.

FIG. 3 shows a side view of one of the holders 4 which hold the measurement device on the table. In the embodiment shown, the holder includes two support rollers 42, on which the tube 5/the measurement device 6 is placed. A third roller 41 is then placed at the top, in such a way that the tube 5/the measurement device 6 is held between the roller elements 41, 42. At least one of the roller elements 41, 42 is driven by an actuator for rolling the tube 5/the measurement device 6 over a desired number of degrees, which is indicated by the arrows on the figure.

Figure 4:
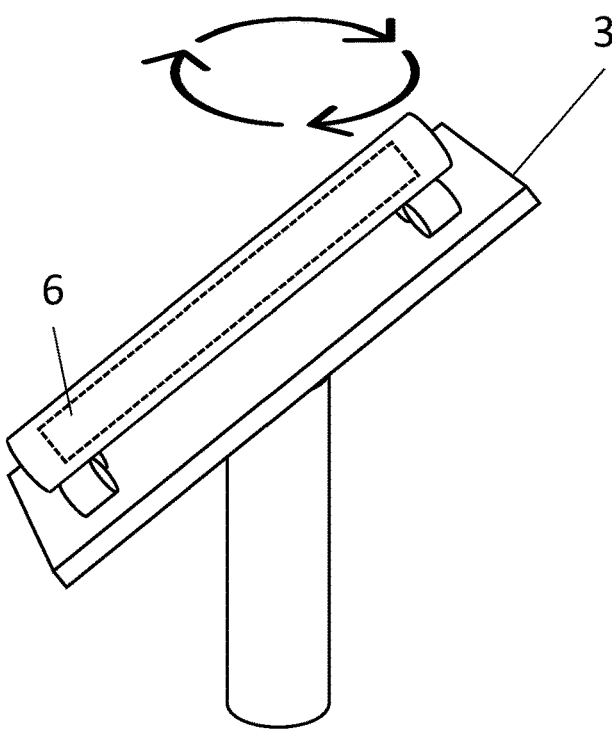
FIGS. 4, 5A-5C and 6A-6C show schematic views of steps of a calibration method according to the invention.

FIGS. 4, 5A-5C and 6A-6C show schematic views of steps of a calibration method according to the invention. FIG. 4 shows an initial routine, involving a rotation of the table around the vertical axis over several revolutions while the table is preferably in a tilted position, preferably a steep position such as 60° or more. FIGS. 5A-5C and 6A-6C show examples of second routines, which each time comprise the steps of tilting the table, bringing the table into two 180° separated positions and rolling the measurement device at least once.

The first routine, shown in FIG. 4, involves a rotation of table 3 about the vertical axis over a number of revolutions, e.g. 2 to 100 revolutions. The number of revolutions is preferably at least 3, preferably at least 5, more preferably at least 10. The number of revolutions of the first routine is preferably at most 50, preferably at most 40, more preferably at most 30. The number of revolutions may also be any other number. The purpose of this first routine is to synchronize an internal clock of the measurement device 6 with the calibration device. This makes it possible to accurately determine how many clock pulses of the measurement device correspond to a complete revolution of the table.

The second routines, two examples of which are shown in FIGS. 5A-5C and 6A-6C, each involve the following steps.

Figure 5A:
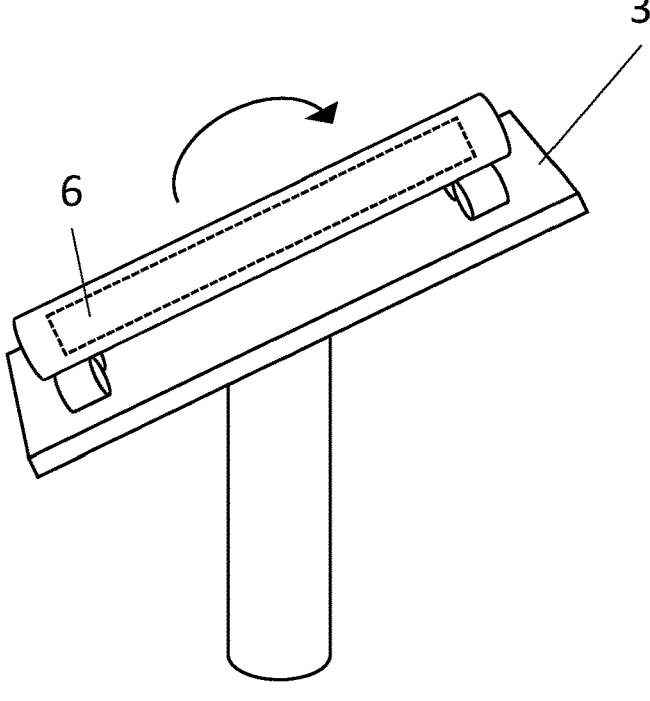
Figure 5B:
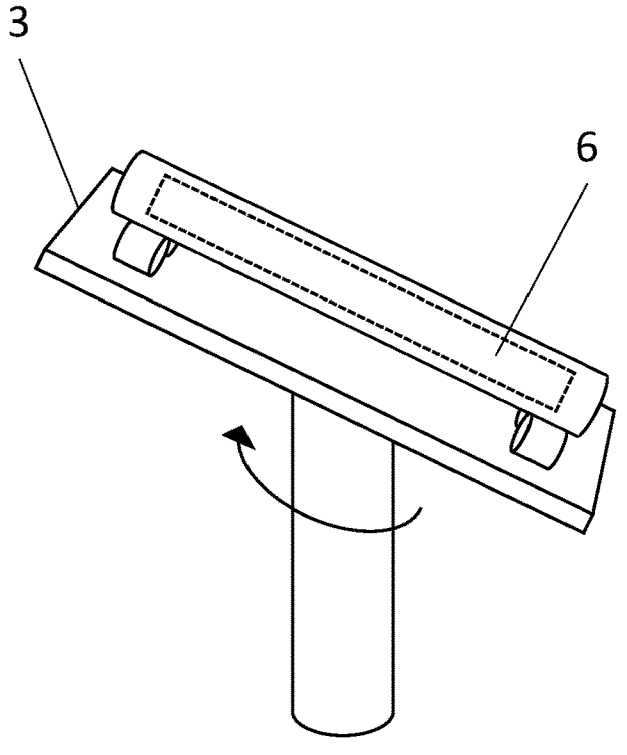
Figure 6A:
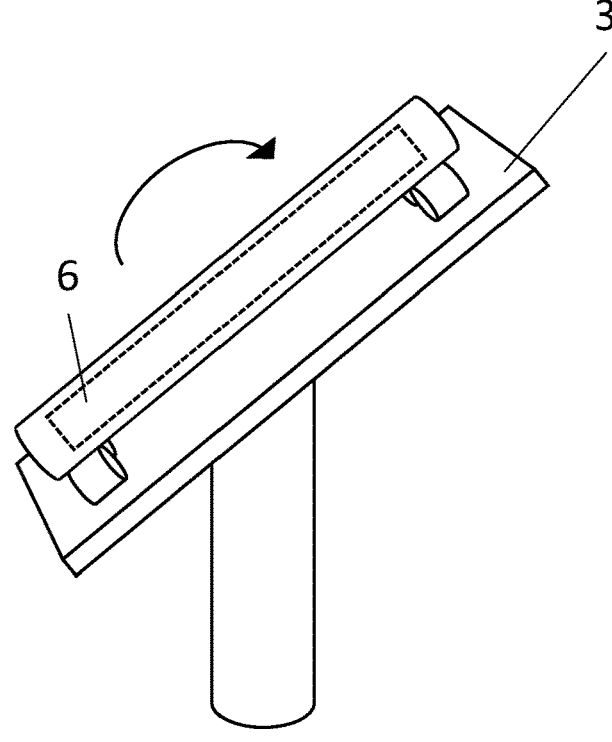
Figure 6B:
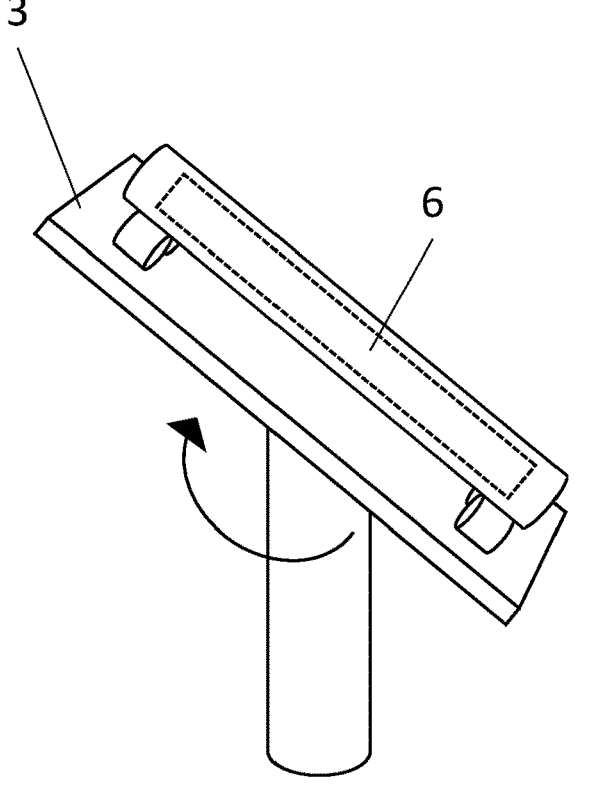

A first step (a), shown in FIGS. 5A and 6A, is to tilt the table 3 to a predetermined angle (relative to the horizontal position). For example, this predetermined angle may be chosen from the group containing −60°, −45°, −30°, −15°, 0°, 15°, 30°, 45°, 60°. However, the predetermined angle may also be any other angle.

A second step (b), shown in FIGS. 5B-5C and 6B-6C, involves positioning the table in two still positions, rotated 180° relative to each other, by rotation around the vertical axis over two times 180° with a predetermined rest period in between. For example, this rest period may be at least 1 s, preferably at least 2 s, more preferably at least 3 s, and/or at most 10 s, preferably at most 8 s, more preferably at most than 5 s. The purpose of this step is to collect measurement data that are 180° separated from each other and to determine measurement errors that cancel each other out as a result of an opposite sign. This also allows the measurements to be compensated for the earth's rotation.

Figure 5C:
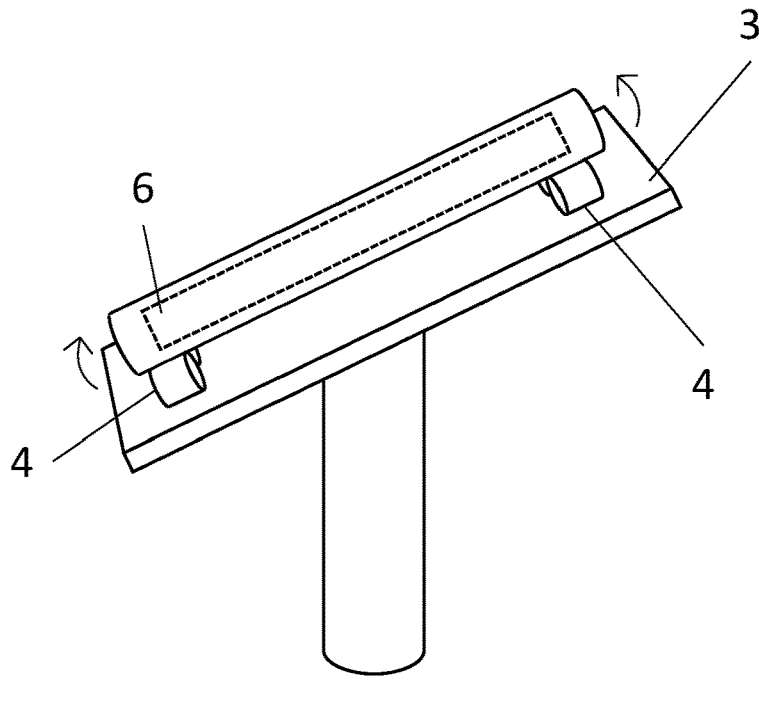
Figure 6C:
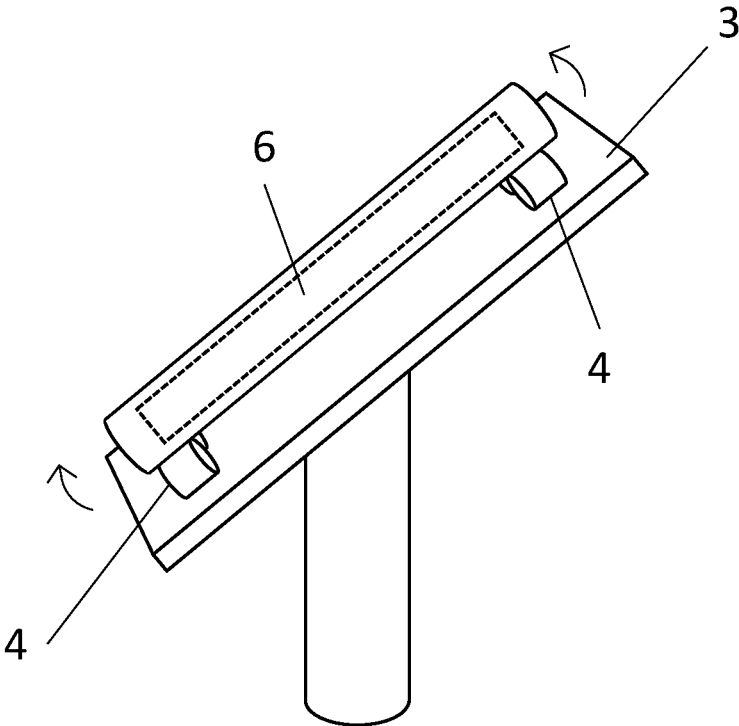

A third step (c), shown in FIGS. 5C and 6C, involves rolling the measurement device over a predetermined number of degrees, e.g. at least 5°, preferably at least 10° and/or at most 90°, preferably at most 60°, more preferably at most 30°. This results in a different (roll) position of the measurement device for a subsequent measurement according to step (b).

Steps (b) and (c) are preferably repeated at least once. Preferably, the steps are repeated such a number of times that the measurement device is rolled a full 360° in every second routine and thus returned to its original (rolling) position, before the table 3 is tilted to a different angle (=a new step (a) of a subsequent second routine). For example, in every second routine, the measurement device may be rolled 4 times 90°, or 6 times 60°, or 8 times 45°, or 12 times 30°, or 36 times 10°, etc. In an embodiment, even after a full 360° roll movement, the step (b) can be repeated again for an additional measurement, which then overlaps with the first measurement (the first step (b)) of the respective second routine.

Due to the plurality of second routines, a large number of redundant (or overlapping) measurement data and/or measurement data that cancel each other out can be obtained, more specifically measurement data in overlapping positions and/or 180° separated positions. The measurement data may then be analyzed by means of computer implemented steps, as described above. By means of these computer implemented steps for analyzing the measurement data, measurement errors may be determined, which may subsequently be taken into account during the measurement of an underground pipeline using the calibrated measurement device and/or when processing measurement data collected by means of the calibrated measurement device.

In a final step, the first of the second routines can be repeated as a control routine. This means that the table is brought back to the first tilted position (step (a)), for example −60°, after which steps (b) and (c) are repeated. The measurements of this control routine may subsequently be compared with those of the first of the second routines. For example, the analysis may be programmed to give an error message if these values do not sufficiently correspond with each other, for example differ by more than 0.1%. If the values do not sufficiently correspond, this may mean, for example, that the measurement device is defective or that the measurement device was not properly fixed to the calibration device.

The invention claimed is:

1. A method for calibration of a measurement device for mapping underground pipes, wherein the measurement device comprises at least gyroscopes and accelerometers, the method comprising the steps of mounting the measurement device on a calibration device that is provided for performing a calibration program on the measurement device, and executing the calibration program by means of the calibration device, wherein the calibration device comprises the following parts:

a table on which the measurement device is mountable, the table being rotatable around a vertical axis and tiltable around a horizontal transverse axis, at least one holder on the table, provided for holding the measurement device on the table, each holder being equipped with roller elements for rolling the measurement device around a longitudinal axis in relation to the table, actuators for driving rotational and tilting movements of the table and rolling movements of the roller elements, and a control unit configured for executing the calibration program by controlling the actuators;

wherein the calibration program comprises the following routines:

a first routine, involving a rotation of the table around the vertical axis over several revolutions while the table is in a tilted position;

a plurality of second routines, each comprising the steps of:

a) tilting the table to a predetermined angle, b) positioning the table in two still positions, 180° separate from each other, by rotation around the vertical axis over two times 180° with a predetermined rest period in between, c) rolling the measurement device over a predetermined number of degrees, d) repeating steps b and c at least once;

and wherein the method further comprises computer implemented steps for analyzing measurement data collected by the measurement device during the execution of the calibration program.

2. The method according to claim 1, wherein the number of revolutions of the first routine is at least 3.

3. The method according to claim 1, wherein the number of revolutions of the first routine is at most 50.

4. The method according to claim 1, wherein the predetermined angle of step a of each second routine is chosen from the group containing –60°, –45°, –30°, –15°, 0°, 15°, 30°, 45°, 60°.

5. The method according to claim 1, wherein the predetermined rest period of step b of every second routine is at least 1 s.

6. The method according to claim 1, wherein the predetermined rest period of step b of every second routine is at most 10 s.

7. The method according to claim 1, wherein the number of degrees of step c of every second routine is at least 5°.

8. The method according to claim 1, wherein the number of degrees of step c of every second routine is at most 90°.

9. The method according to claim 1, wherein the number of repetitions of steps b and c of each second routine is such that the measurement device is rolled a full 3600 in every second routine.

10. The method according to claim 1, wherein the computer implemented steps for analyzing the measurement data comprise one or more of the following steps:

determining, on the basis of the duration of the number of revolutions of the first routine, how many clock pulses of an internal clock of the measurement device correspond on average to a complete revolution of the table;

comparing the measurement data collected during each complementary pair of the second routines in which the table is respectively tilted to the opposite angle in step a;

comparing the measurement data collected during each step b of each second routine, preferably during the two still positions and/or during the rotation around the vertical axis over two times 180°.

11. The method according to claim 10, wherein the computer implemented steps for analyzing the measurement data determine measurement errors based on one or more of the comparison steps.

12. A method for mapping an underground pipeline, comprising the steps of calibrating a measurement device by means of a calibration method according to claim 1, moving the measurement device through the underground pipeline at least once and determining a trajectory of the underground pipeline on the basis of measurement data collected during the movement of the measurement device at least once through the underground pipeline, wherein measurement errors determined by means of the calibration method are taken into account upon determining the trajectory.

13. A system provided for the calibration of a measurement device for mapping underground pipelines, wherein the measurement device comprises at least gyroscopes and accelerometers, the system comprising a calibration device on which the measurement device is mountable and which is configured for performing a calibration program on the measurement device, wherein the calibration device comprises the following parts:

a table on which the measurement device is mountable, the table being rotatable around a vertical axis and tiltable around a horizontal transverse axis, at least one holder on the table, provided for holding the measurement device on the table, each holder being equipped with roller elements for rolling the measurement device around a longitudinal axis in relation to the table, actuators for driving rotational and tilting movements of the table and rolling movements of the roller elements, and a control unit configured for executing the calibration program by controlling the actuators;

wherein the calibration program comprises the following routines:

a first routine, involving a rotation of the table around the vertical axis over several revolutions while the table is in a tilted position;

a plurality of second routines, each comprising the steps of:

a) tilting the table to a predetermined angle, b) positioning the table in two still positions, 180° separate from each other, by rotation around the vertical axis over two times 180° with a predetermined rest period in between, c) rolling the measurement device over a predetermined number of degrees, d) repeating steps b and c at least once;

and wherein the system further comprises a computer system for performing computer implemented steps for analyzing measurement data collected by the measurement device during the execution of the calibration program.

14. The system according to claim 13, wherein the number of revolutions of the first routine is at least 3 and/or wherein the number of revolutions of the first routine is at most 50.

15. The system according to claim 13, wherein the predetermined angle of step a of each second routine is chosen from the group containing –60°, –45°, –30°, –15°, 0°, 15°, 30°, 45°, 60°.

16. The system according to claim 13, wherein the predetermined rest period of step b of every second routine is at least 1 s.

17. The system according to claim 13, wherein the number of degrees of step c of every second routine is at least 5° and/or wherein the number of degrees of step c of every second routine is at most 90°.

18. The system according to claim 13, wherein the number of repetitions of steps b and c of each second routine is such that the measurement device is rolled a full 360° in every second routine.

19. The system according to claim 13, wherein the computer implemented steps for analyzing the measurement data comprise one or more of the following steps:

determining, on the basis of the duration of the number of revolutions of the first routine, how many clock pulses of an internal clock of the measurement device correspond on average to a complete revolution of the table;

comparing the measurement data collected during each complementary pair of the second routines in which the table is respectively tilted to the opposite angle in step a;

comparing the measurement data collected during each step b of each second routine, preferably during the two still positions and/or during the rotation around the vertical axis over two times 180°.

20. The system according to claim 19, wherein the computer implemented steps for analyzing the measurement data determine measurement errors based on one or more of the comparison steps.

* * * * *